United States Patent [19]
Sajeva

[11] 3,940,745
[45] Feb. 24, 1976

[54] DATA PROCESSING UNIT HAVING A PLURALITY OF HARDWARE CIRCUITS FOR PROCESSING DATA AT DIFFERENT PRIORITY LEVELS

[75] Inventor: Raoul Sajeva, Ivrea, Turin, Italy

[73] Assignee: Ing. C. Olivetti & C., S.p.A., Ivrea, Turin, Italy

[22] Filed: Apr. 26, 1974

[21] Appl. No.: 464,726

[30] Foreign Application Priority Data
June 5, 1973 Italy.................................. 68650/73

[52] U.S. Cl. ........................................... 340/172.5
[51] Int. Cl.².... G06F 9/18; G06F 9/16; G06F 9/10
[58] Field of Search................................. 340/172.5

[56] References Cited
UNITED STATES PATENTS
3,333,252   7/1967   Shimabukuro................... 340/172.5

Primary Examiner—Gareth D. Shaw
Assistant Examiner—James D. Thomas
Attorney, Agent, or Firm—I. J. Schaefer

[57] ABSTRACT

A data processing unit having a plurality of hardware data processing circuits each one including a program counter register for addressing the microinstructions, an accumulator register and an addressing register for storing the addressing of the operands of the microinstructions. Means are provided for switching the CPU from the hardware data processing circuits having a predetermined priority level to the hardware data processing circuits having a less priority level, by executing a particular microinstruction, which includes information either about the changing of the priority level or about the memory address of the starting microinstruction of the microprogram to be executed on the less priority level.

5 Claims, 3 Drawing Figures

DATA PROCESSING UNIT HAVING A PLURALITY OF HARDWARE CIRCUITS FOR PROCESSING DATA AT DIFFERENT PRIORITY LEVELS

BACKGROUND OF THE INVENTION

1. Field of the invention

This invention refers to a data processing unit having facilities for changing the priority level of data processing circuits.

Particularly the data processing unit comprises a plurality of hardware data processing priority circuits, a memory for storing a plurality of microinstructions and, for each of said priority levels, a program counter register for addressing said microinstructions in succession and an addressing register for storing the addresses of the operands of said microinstructions.

2. Description of the Prior Art

As is known, most electronic computers are provided with a plurality of processing priority levels and each of such levels executes a predetermined number of processing operations. For instance, in a three level computer, the level three (having the less priority) is used for computing and controlling the data, while the levels one and two are used for the character interchange with the peripheral units.

Several systems are known for shifting from a priority level to another one having a less priority as a consequence of particular events occurring during the data processing. For instance, one of such events occurs when a computer is processing data by using hardware of the priority level having order 3 and it is interrupted by a peripheral unit requesting a "character interchange operation". At this moment the computer stops the processing in progress at the level 3 and manages the character interchange operation by using hardware of the level 2. As is known, such management is executed by the interrupt facility which allows the "overlapping" operation of both the character interchange at level 2 and the processing at level 3.

When the character interchange has been performed, the peripheral unit communicates this event in a known manner to the computer which checks up on the received characters, for instance the computer may carry out a parity check operation by means of a redundancy polynominal in the case where the characters have been transmitted from a magnetic substrate reading unit. This checking operation is generally carried out by a specific program and executed at level 3 which is, as said above, the level wherein all checking operations take place. When the character interchange operation has finished, the data processing unit must switch from the level 2 (which is the level whereat the interchange occurred) to the service microprogram of the level three to manage the checking operation of the characters and at the same time it is required to reserve the microprogram of the level, the execution of which is already in progress.

In a known system these operations are carried out separately by means of two instructions: one instruction executes the "reservation" operation, namely it transfers the program counter contents of the level three onto a suitable memory register; the other instruction carries out the shifting operation from the level 2 onto a special memory cell whereon is stored the address of the first service program instruction to be executed at the level three.

Such a system has two disadvantages: the first being that the control switching occurs by means of the execution of two instructions, wherefore the time required for switching the control from the level 2 onto the level 3 is the sum of the execution times of the two instructions. The second disadvantage being that afterwards it is still required to transfer the contents of the memory cell addressed by the second instruction onto the program counter of the level three. Consequently the total time required for the control switching from the level two onto the level three must be further increased.

OBJECTS AND SUMMARY OF THE INVENTION

It is thus an object of the present invention to provide a unit which eliminates the aforementioned disadvantages by reducing the time required for shifting from a priority level, for instance the level 2, onto a specific service program of another level having a lower priority, for instance the level 3.

BRIEF DESCRIPTION OF THE DRAWINGS

A preferred embodiment of the invention is now described with reference to the accompanying drawings wherein.

DETAILED DESCRIPTION OF THE INVENTION

Figure 1:
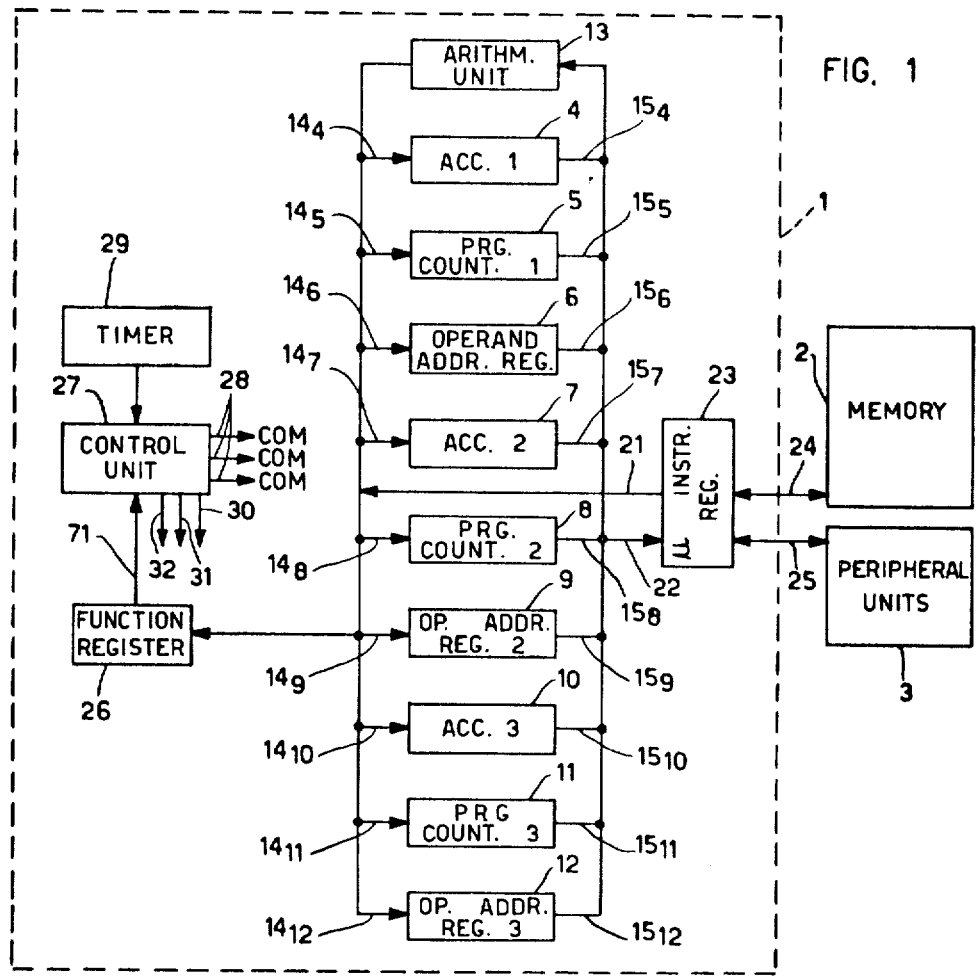
FIG. 1 is a block diagram of a CPU.

The system according to the invention is applied to a CPU 1 (FIG. 1) which is connected with a memory 2 and a group of peripheral units, generically identified by 3, by any known data linking means. The memory 2 is of the known type and is preferably embodied by MOS-LSI circuits (integrated metal oxide semi-conductors). The memory 2 preferably has a capacity of 256 × 256 cells, each of the cells storing an 8-bit byte and is split into 256 sections called pages. Therefore, the addressing of a cell of the memory requires 16 bits, of which eight bits are used for identifying the page and eight bits for identifying the cell within the page.

The first memory page, called the zero page, is of the read/write type and it is identified by the symbol RAM, while all other pages are of the read-only type being identified by the symbol ROM. The ROM pages of the memory 2 can suitably contain the microinstructions to be executed by the central unit 1 in order to carry out the many operations requested. The sequence whereby the microinstructions are read from the ROM pages and transferred onto the central unit 1 to be executed is defined according to the program stored on the zero page. In fact, the zero page stores the instruction of the program entered to the operator by means of the peripheral units 3, for instance, such as by a keyboard or a magnetic card reader.

Furthermore, the zero page contains a zone called a reserved zone, adapted to contain specific registers which will be described below.

The CPU 1 is suitable for processing the data at a plurality of priority levels, each of them managing, at different execution rates, predetermined operations, for instance, such as the data interchange operations with the peripheral units 3, the writing and reading operations on the memory 2, the computing operations, etc.

In the present specification reference is made to a CPU 1 provided with three priority levels. Nevertheless, the device according to the invention can be applied to control units provided with a different number of priority levels.

Each of the three priority levels comprises a specific hardware including a group of operational registers having a 16-bit capacity and, more precisely, an accumulator register 4, a program counter register 5, and an operand address register 6. Similarly, the levels two and three are provided with three registers 7, 8, 9 and three registers 10, 11, 12 similar to the registers 4, 5, 6 respectively. The shifting operation from a priority level 3 onto a priority level 2, or from the level 2 onto the level 1 occurs by means of suitable microinstructions which are not described in detail as they do not deal with the object of the present invention.

For defining the operation priority level, the control unit 27 energizes one of three wires 30, 31 or 32 corresponding to the selected level. In particular, the wire 30 enables the operation of the registers 4, 5 and 6 of the first level, the wire 31 enables the registers 7, 8 and 9 of the second level, and the wire 32 enables the registers 10, 11 and 12 of the third level. More details will be supplied below about the operations of the wires 30, 31 and 32.

The CPU 1 furthermore comprises an arithmetic unit 13 for executing the arithmetic operations and which is connected with both the inputs $14_4 - 14_{12}$ and the outputs $15_4 - 15_{12}$ of the registers 4 - 12. The inputs $14_4 - 14_{12}$ and the outputs $15_4 - 15_{12}$ are in turn connected with an input/output register 23 of the CPU 1 by means of the channels 21 and 22 respectively. The register 23 is connected with the memory 2 and the peripherals 3 by means of the channels 24 and 25.

Furthermore, the CPU 1 comprises a register 26, having eight cells connected with the channels 21 and 22 for storing, as will be seen below, the code combination of the microinstructions the control unit must execute each time. The register 26 is in turn connected with a control unit 27 by means of a channel 71, the control unit 27 generating a sequence of control signals hereinafter identified by the symbol COM and applied to the outputs 28 as a function of the code combination stored on the register 26. The control unit 27 is timed by a timer 29, and consequently the signals COM are generated in succession at a timing rate which is defined by the timer 29. The control unit 27 is not specified in detail, as it may be readily embodied by one skilled in the art.

In fact, the control unit 27 is substantially a decoding combination network, decoding the microinstruction code combination stored each time in the register 26. As a consequence of the decoding of a microinstruction the combination network selects only some of the outputs 28, which are then sequentially energized by the timer 29 generating the control signal COM. These control signals act, as it will be specified below, upon the channels interconnecting the registers 4 - 12 and the arithmetic unit 13, or upon the channels 21 and 22, controlling in this way the data flow in the CPU 1 and between the CPU 1 and the external peripherals 3.

Figure 2:
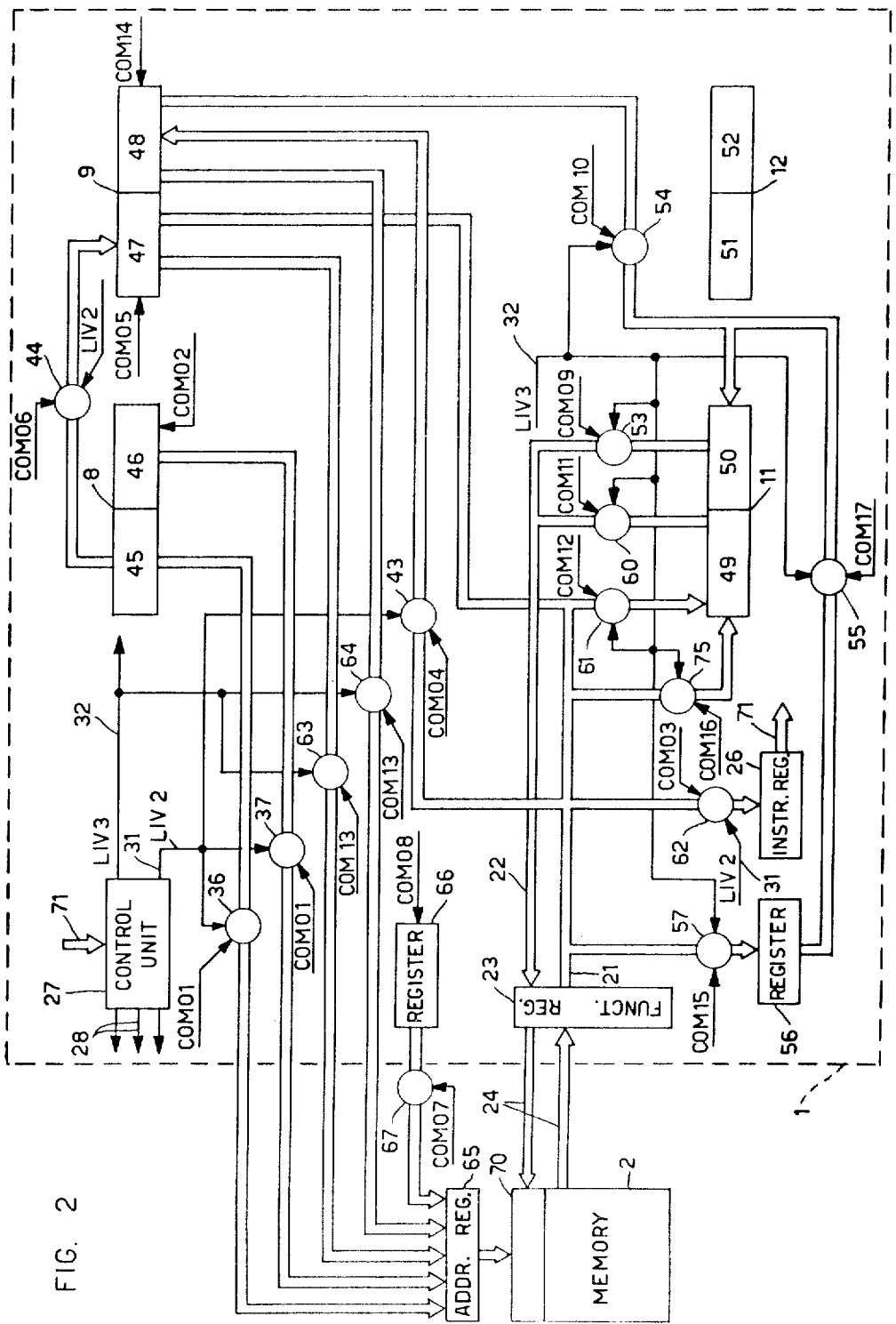
FIG. 2 is a block diagram of the facilities of the CPU in accordance with the invention.

With reference to the FIG. 2, there are now set forth in detail connections between the registers of the CPU 1 and the memory 2 and the control unit 27, which are related to the invention. In order to simplify the description, only the connections related to the shifting operation from the priority level 2 to the priority level 3 are pointed out, but nevertheless the same connection means are used for the levels one and two and, more generally, for the levels $n$ and $n + 1$.

In FIG. 2 the connections between the registers are shown by channels carrying eight bits in parallel and the data transferring direction is defined by the arrows. The data transferring operation from one register to another occurs if the gate circuit inserted on the linking channel and indicated by a circle, is enabled by the corresponding control signal COM. For instance, the content of the register 8 is transferred into the register 65 only when the control unit 27 generates a control signal COM01 which enables the gate circuits 36 and 37. As set forth, the registers 8, 9, 11 and 12 have a 16-bit capacity, each being split into two sections each having an 8-bit capacity, wherein one stores the least significant bits and the other the most significant bits. In particular, the register 8 is split into the sections 45 and 46, the registers 9 is split into the sections 47 and 48, the register 11 is split into the sections 49 and 50, and the register 12 is split into the sections 51 and 52.

The section 45 of the register 8 is connected with the section 47 of the register 9 by means of the gate circuit 44, while the section 48 of the register 9 is connected with the output channel 21 of the register 23 by means of the gate circuit 43.

The input channel 22 of the register 23 is connected with the section 50 of the register 11 by means of the gate circuit 53, the section 50 of the register 11 is in turn connected with the section 48 of the register 9 by means of a gate circuit 54 and with the output of an 8-bit register 56 by means of a gate circuit 55. The register 56 is in turn connected with the output channel 21 of the register 23 by means of the gate circuit 57. The section 49 of the register 11 is connected with the channel 22 by means of the gate circuit 60 and with the channel 21 by means of a gate circuit 61. The register 26 is connected with the channel 21 by means of a gate circuit 62 and the section 49 of the register 11 by means of a gate circuit 75. Furthermore, the sections 45 and 46, 47 and 48 of the registers 8 and 9 are connected with the input of a register 65 of the memory 2 by means of the gate circuits 36, 37, 63 and 64.

Furthermore, another 8-bit register called the "pointer" register 66 is connected with the register 65 by means of a gate circuit 67.

The register 65 is the addressing register of the memory 2 and it comprises 16 cells. This register is used for selecting the memory cell in which a character must be read or written. Moreover, the memory 2 comprises a zone 70 located on the zero page on which the reserving addresses of the interrupted microprograms are recorded each time. More precisely, when a microprogram execution which is in progress at a predetermined level, is interrupted because a microprogram must be executed at another priority level, the address, called old program starting address (OPSA) of the interrupted microprogram is to be reserved. In this address is recorded the microinstruction subsequent to the last microinstruction executed by the microprogram of the interrupted priority level. It is to be noted that it is not required to reserve the address of the microinstruction of the program executed on the interrupted level, because, as set forth, the accumulators, the program counters and the operand address registers are supplied for each of the priority levels.

All old program starting addresses (OPSA) are stored on successive cells of the zone 70. The addressing of the zone 70 cells is performed by the "pointer" register 66 which is connected, as seen above, with the addressing register 65. As is explained below, the "pointer" register 66 is increased by one each time a microprogram is interrupted, and in this way the "pointer" register 66 always identifies the first free cell of the zone 70 whereon the old program starting address of the interrupted priority level microprogram may be stored. It is to be noted, finally, that the gate circuits 36, 37, 43, 44 and 62 may be energized only at the second level as they are enabled by the wire 31 and on the contrary all other gate circuits may be energized at the third level, with the exception of the gate circuit 67 which may be enabled at all of the three levels. The functional description of the device according to the invention will now be explained.

It is assumed that the CPU 1 is processing the data at the priority level 2 and thus the control unit 27 has energized the wire 31. It is furthermore assumed that, during the microprogram execution, the CPU 1 should carry out a microinstruction called "JSL" which has the purpose, as it will be seen below, to switch the CPU 1 from the level 2 to the level 3.

Figure 3:
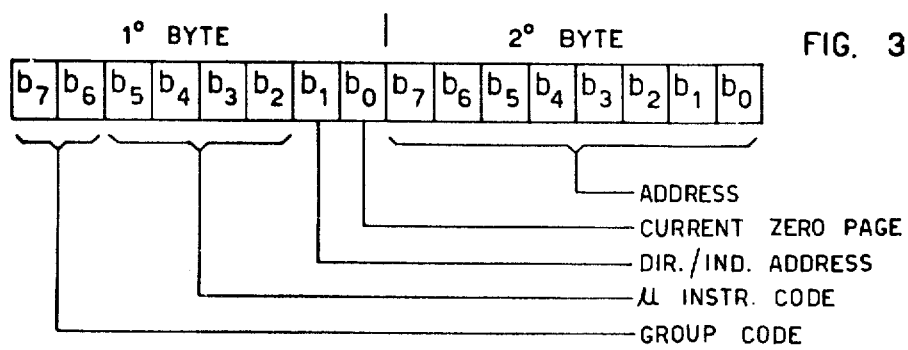
FIG. 3 shows the format of a specific microinstruction executed by the system of FIG. 2.

The microinstruction JSL is built up of two 8-bit bytes (FIG. 3) wherein the first byte has the following meaning: the bit 0 specifies whether the address identified by the second microinstruction byte is located in the "zero" page or in the "current" page. The "current" page is defined as the memory page wherein the microinstruction JSL has been read; the bit 1 specifies the direct or the indirect addressing mode. In the first case the contents of the second microinstruction byte is the operand address (of "zero" or "current" page according to the level of the bit 0). In the second case it specifies the first of two adjacent cells of the memory 2 wherein are stored the two bytes forming the operand address. The bits 2–5 specify the code combination of the instruction JSL within the extent of the microinstruction group; the bits 6–7 specify the microinstruction group to which the microinstruction belongs.

The second byte of the microinstruction JSL specifies, as already set forth, the memory location wherein the operand is recorded when the direct addressing operation mode is used, and the first of two adjacent cells of the memory 2 containing the operand address when the indirect addressing operation mode is used.

The microinstructions are executed by the CPU 1 on successive cycles having a period established by the timer 29. More precisely, the CPU 1 executes the microinstructions within two stages, the first stage comprising two cycles during which the CPU 1 carries out the recognition of the microinstructions. The second stage comprises a number of cycles being variable for each microinstruction and during which the operations related to the recognized microinstruction are carried out.

The recognition stage is executed as follows:

In synchronism with the first timing signal generated by the timer 29 the control unit 27 generates the control signal COM01 which enables the gates 36 and 37 and transfers the bits specifying the last address used during the previous microinstruction of the memory 2, from the program counter 8 into the addressing register of the memory 2. Then, the control unit 27 generates the control signal COM02 which causes the register 8 contents to be increased by one unit. Subsequently, the control unit 27 generates the control signals COM03 which causes the transferring of the 8-bit information contained in the addressed cell, from the register 65 into the instruction register 26.

In this way, at the output 71 of the microinstruction register 26 is stored the 8-bit code of the first byte of the microinstruction JSL; and this code is transmitted onto the control unit 27 by means of the output 71.

Subsequently, the control unit 27 loads the instruction operand address (second byte) into the register 9 during a second cycle, as will be described below. The control unit 27 generates the control signal COM01 which transfers the contents of the register 8 (which was increased by one unit during the previous cycle) into the addressing register 65; thus the control unit 27 generates the control signal COM04 which transfers the contents of the memory 2 cell addressed by the register 65 into the section 48 of the register 9. In order to complete the operand address, the control unit 27 generates the control signal COM05 if the bit 0 of the first byte is at level 1, or the control COM06 if the bit 0 is at level 0. In the first case the control signal COM05 writes eight bits at level 0 into the section 47 of the register 9, and thus the address stored on the section 48 of the register 9 relates to the zero page. In the second case the control signal COM06 transfers the contents of the section 45 of the register 8 into the section 47 of the register 9. As already set forth, the section 45 contains the number of the page from which was read the microinstruction in execution, wherefore the "current" page is forced into the section 47 of the register 9. The control unit 27 generates subsequently a new control signal COM02 which increases by one the contents of the register 8.

Therefore, at the end of the second cycle the code combination of the instruction JSL (first byte) is stored on the register 26, the second byte of the microinstruction is stored on the register 9, and the address of the memory 2 wherein is stored the first byte of the subsequent microinstruction, is stored in the register 8.

After this, the control unit 27 starts the execution stage of the instruction JSL. As the timer 29 generates the first timing impulse, the control unit 27 generates the control signal COM07 which transfers the contents of the "pointer" register 66 into the addressing register 65. As set forth above, the "pointer" register 66 contains the address of the first free cell of the zone 70 of the memory 2 in which are stored the old program starting addresses (OPSA). As explained above, such a zone is located on the zero page wherefore the eight bits of the "pointer" register 66 are sufficient to address a cell in the zero page. Subsequently, the control unit 27 generates the control signal COM08 which increases by one the contents of the "pointer" register 66.

At this moment the control unit 27 disenables the wire 31 and enables the wire 32, consequently all control signals subsequently generated by the control unit 27 will concern the gate circuits of the third priority level only, wherefore all registers of the second level are no longer influenced by these control signals. In this way the address stored in the program counter register 8 of the level 2 is static and it is not modified during the operations at level 3, and therefore no reserving operation of the address concerned is required.

On the contrary, the control unit 27 carries out, as shown below, the reserving operation of the last address stored on the program counter 11 of the level 3 the control unit 27 generates the control signal COM09 which transfers the eight bits stored in the section 50 of the register 11 starting from the memory cell addressed by the addressing register 65. As said above, this cell being specified by the pointer register 66, is the first free cell of the address reserving zone 70. After the reserving operation of the less significant bits of the program counter 11, the control unit 27 generates the control signal COM10 which transfers the eight bits stored in the section 48 of the register 9 into the section 50 of the program counter 11. Subsequently, the control signal COM07 is newly generated and it forces the contents of the pointer register 66 into the addressing register 65. It is to be pointed out that the contents of the register 65 have been previously increased by one by the control signal COM08. Then, the control unit 27 generates the control signal COM08 which still increases the contents of the pointer register 66 by 1. At this moment the control unit 27 provides the reserving of the 8 bits stored on the section 49 of the program counter 11 by generating the control signal COM11, which transfers these bits into the memory cell specified by the pointer register 66, the cell being subsequent to the one wherein the bits contained by the section 49 of the register 11 were stored.

Subsequently, there is generated a control signal COM12 which transfers the contents of the section 47 of the register 9 into the section 49 of the program counter 11.

At this moment the second byte of the microinstruction JSI is stored on the program counter 11 of the level 3 and in the address reserving zone 70 is stored the microinstruction address, which must be resumed the level 3 program interrupted by the control unit 27. The pointer register 66 stores the address of the first free cell of the zone 70 which may thus be used for possible subsequent reserving operations.

As it was previously set forth, the bits of the second byte of the instruction JSL have different meanings according to the addressing mode (direct or indirect) selected by the bit 1 of the first byte. If the addressing mode is direct, these bits specify the address of the first instruction to be executed. As this address is stored in the program counter 11 of the level 3 and the control unit 27 generates now the control signal COM01 which activates only the registers of the level 3, as there is energized the wire 32 related to the level 3. Therefore, the recognition stage of the first microinstruction of the level 3 is started and then is followed by the execution stage.

If the addressing mode is indirect, the bits stored on the register 9 (which are the same stored in the register 11) specify the address of the first of the two adjacent cells of the memory 2 which contain the operand address. Consequently, the control unit 27 generates the control signal COM13 which transfers the address stored on the register 9 of the level 2 into the addressing register 65; consequently, there is generated the control signal COM14 which increases the contents of the register 9 by one unit. At this moment the control unit 27 generates the control signal COM15 which transfers the contents of the cell addressed by the register 65 into the register 56. Subsequently, the control signal COM13 is again generated and it forces the contents of the register 9 into the addressing register 65. The register 9 is then increased by one of the control signal COM14. Subsequently, the control unit 27 generates the control signal COM16 which transfers the contents of the memory cell addressed by the register 65 into the section 49 of the program counter 11 of the level 3, and furthermore the control unit 27 generates the control signal COM17 which transfers the contents of the register 56 onto the section 50 of the program counter 11. In this way the address of the first instruction of level 3 to be executed is recognized by the program counter 11.

Then, the control unit 27 again generates the control signal COM01 which energizes only the registers of the level 3, as there is now energized the wire 32 of the level 3. The execution of the level 3 instruction is now started in a mode which is substantially similar to what explained for the instruction JSL.

For the sake of clarity, there is listed on the chart below the sequence of the control signals generated by the control unit 27 for executing the instruction JSL. For each control signal, there are shown on the second column of the chart the gate circuits energized and on the third column there are the registers connected by the energization of the corresponding gate circuit. The increasing by one of a register is indicated by the symbol 8 + 1   8; finally, it is to be noted that the control signals subsequent to the COM12 one are generated in the event of indirect addressing operation mode only.

| Control signal | GATE | Operation | |
|---|---|---|---|
| COM01 | 36, 37 | 8 | 65 |
| COM02 | — | 8+1 | 8 |
| COM03 | 62 | 2 | 26 |
| COM01 | 36, 37 | 8 | 65 |
| COM04 | 43 | 2 | 48(9) |
| COM05 | — | 0 | 47(9) |
| COM06 | 44 | 45(8) | 47(9) |
| COM02 | — | 8+1 | 8 |
| COM07 | 67 | 66 | 65 |
| COM08 | — | 66+1 | 66 |
|  | — |  | 32 |
| COM09 | 53 | 50(11) | M |
| COM10 | 54 | 48(9) | 50(11) |
| COM07 | 67 | 66 | 65 |
| COM08 | — | 66+1 | 66 |
| COM11 | 60 | 49(11) | M |
| COM12 | 61 | 47(9) | 49(11) |
| COM13 | 63, 64 | 9 | 65 |
| COM14 | — | 9+1 | 9 |
| COM15 | 57 | 2 | 56 |
| COM13 | 63, 64 | 9 | 65 |
| COM16 | 75 | M | 49(11) |
| COM17 | 55 | 56 | 50(11) |

What I claim is:

1. In a data processing unit of the type having a plurality of hardware data processing circuits for processing data at corresponding priority levels, a memory for storing microinstructions and, for each of said priority levels a program counter register for addressing in succession said microinstructions, wherein the improvement comprises:

means controlled by a level change signal defined by a predeterined microinstruction executed by the circuits of a predetermined priority level for switching said unit from said predetermined level to a lower priority level, said predetermined microinstruction comprising a first character code for defining the priority level change microinstruction and a second character code for specifying an address;

a first register included in said data processing unit for storing said first character code;

a control unit connected to said first register for decoding said first character code and for generating a plurality of control signals in accordance with said predetermined microinstruction defined by said first character code;

means responsive to said control signals for transferring the content of the program counter register of said lower priority level into a predetermined location of said memory; and means responsive to said control signals for storing the address specified by said second character code into said program counter register of said lower priority level.

2. A data processing unit according to claim 1, further comprising an addressing register for each priority level for storing the operand addresses of microinstructions and wherein said memory is split into a plurality of pages each of said pages comprising a plurality of cells, said program counter registers and said address registers being split into a first section defining a predetermined page in said memory and into a second section defining a predetermined cell in said predetermined page and wherein, a bit of said first character is decoded by said control unit for selectively generating a first control signal for transferring the bits stored on the first section of said program counter register into the first section of said address register, and a second control signal for clearing said first section of said address register, said second character being stored by said control unit into the second section of said address register.

3. A data processing unit according to claim 2, wherein said control unit includes means controlled by said predetermined microinstruction for generating a third control signal for transferring the contents of the program counter register of said lower priority level into said predetermined location of said memory.

4. A data processing unit according to claim 3, further comprising a second register in said control unit the contents of which defines said predetermined location of said memory, said contents being increased by said control unit when said predetermined microinstruction is present.

5. A data processing unit according to claim 3, wherein said control unit further includes means responsive to said predetermined microinstruction for generating a fourth control signal for transferring the contents of the addressing register of the higher priority level into the program counter register of the lower priority level.

* * * * *

UNITED STATES PATENT OFFICE
CERTIFICATE OF CORRECTION

PATENT NO. : 3,940,745
DATED : February 24, 1976
INVENTOR(S) : Raoul Sajeva

It is certified that error appears in the above-identified patent and that said Letters Patent are hereby corrected as shown below:

In Claim 2:

Column 9 line 19, delete ","

after "character" insert --code--;

line 21, delete "on" and insert --in--;

Column 10
        line 1, after "character" insert --code--.

Signed and Sealed this eighteenth Day of May 1976

[SEAL]

Attest:

RUTH C. MASON
*Attesting Officer*

C. MARSHALL DANN
*Commissioner of Patents and Trademarks*